(12) United States Patent
Stettin et al.

(10) Patent No.: US 6,293,471 B1
(45) Date of Patent: Sep. 25, 2001

(54) HEATER CONTROL DEVICE AND METHOD TO SAVE ENERGY

(76) Inventors: Daniel R. Stettin, 2929 Judith Dr., Bellmore, NY (US) 11710; Frank W. Sterber, 9 Thomas Powell Blvd., Farmingdale, NY (US) 11735

( * ) Notice: Subject to any disclaimer, the term of this patent is extended or adjusted under 35 U.S.C. 154(b) by 0 days.

(21) Appl. No.: 09/558,864

(22) Filed: Apr. 27, 2000

(51) Int. Cl.[7] ............... H05B 1/02; F28F 13/00
(52) U.S. Cl. ............ 236/20 R; 219/492; 165/268
(58) Field of Search .................. 236/20 R, 46 R; 219/492; 165/268, 267

(56) References Cited

U.S. PATENT DOCUMENTS

| | | |
|---|---|---|
| 4,166,944 | 9/1979 | Scott . |
| 4,413,775 | 11/1983 | Scott . |
| 4,508,261 | 4/1985 | Blank . |
| 4,522,333 | 6/1985 | Blau, Jr. et al. . |
| 4,522,336 | 6/1985 | Culp . |
| 4,529,121 | 7/1985 | Furth . |
| 4,535,931 | 8/1985 | Bartok et al. . |
| 4,620,667 | 11/1986 | Vandermeyden et al. . |
| 4,832,259 | 5/1989 | Vandermeyden . |
| 5,056,712 | 10/1991 | Enck . |
| 5,103,078 | 4/1992 | Boykin et al. . |
| 5,443,206 | 8/1995 | Cohen . |
| 5,626,287 | 5/1997 | Krause et al. . |
| 5,927,598 | 7/1999 | Broe . |
| 5,968,393 | 10/1999 | Demaline . |

FOREIGN PATENT DOCUMENTS

| | | | |
|---|---|---|---|
| 2176631 | * 12/1986 | (GB) | .................. 236/46 R |
| WO94/29781 | * 12/1994 | (WO) | .................. 236/46 R |

* cited by examiner

Primary Examiner—William Wayner
(74) Attorney, Agent, or Firm—Diller, Ramik & Wight

(57) ABSTRACT

A device and method is provided for automatically controlling the heating element(s) of an electric hot water heater to minimize electric energy consumption over a prolonged time period by projecting the future need for hot water based on it's use in prior time periods as well as by monitoring the use of hot water during current periods. The device saves energy by switching the heater "off" during times when the projected and current need for hot water is low or nonexistent thereby reducing the tank temperature and therefore energy losses to the ambient, while detecting the instantaneous requirement for hot water through utilization of a flow sensor arrangement, one of which is the utilization of thermistors on the exit pipe and on the tank or body of the heater. The device leaves all existing controls intact and may be adapted by end users to existing heaters or by manufacturers of original equipment (OEMs).

31 Claims, 8 Drawing Sheets

HEATER CONTROL DEVICE AND METHOD TO SAVE ENERGY

BACKGROUND OF THE INVENTION

1. Field of the Invention

This invention relates to residential and commercial electric hot water heaters of capacity up to thirty gallons and more specifically to a method for automatically determining when to turn on/off the electric current to such heaters so as to reduce the expenditure for electricity without compromising the users requirement for hot water.

2. Description of the Related Art

An electric hot water heater is illustrated in FIG. 1 and is typically provided with a thermostatic control (1) and a heating element (2) which heats water in a contained vessel (usually a cylindrical tank)(3). An electric current (4) is allowed to flow through the heating element by the thermostatic control which is usually operated by a bi-metallic contact which closes when the temperature of the surrounding water (5) is below the thermostat's "set" temperature and by opening when the temperature of the surrounding water is above the thermostats "set" temperature. Generally, such controls are subject to hysteresis which allows the water temperature to deviate from the set value by ±5° F. or ±10° F. Thermostat "set" temperatures are typically between 120° F. and 180° F. The modem water heater is often fitted with "heat-trap" devices (6) (commonly, an antiflow valve fated to a low heat conducting plastic pipe) which minimize heat losses to the adjoining inlet (7) and exit (8) pipes due to natural convection and conduction of hot water.

With most electric hot water heater controls there is normally no attempt to regulate the flow of electric current to the heater other than by the thermostat, and the water contained within the heater remains at or near the "set" temperature 24 hours a day regardless of the use of zero, small, or large volumes of water. This results in significant energy losses to the environment during extended periods of non-use of hot water, which would otherwise be significantly reduced were the heater in the switched off condition. The heat loss to the environment (Btu loss) related to the difference between the tank water temperature and the temperature of the ambient is linear; other factors, such as the ambient air velocity, pipe losses, etc., are not linearly related but also affect the heat loss. The tank temperature, however, responds to these losses as an exponential mathematical function of time.

During periods of no hot water use, the typical heater control responds to the various environmental factors which cool the tank and hence the water therein, by cycling the electric current so as to maintain the water at the "set" temperature. It is noteworthy that when tank water temperatures are reduced, there are savings in energy that accrue over time due to the difference in tank to ambient temperature; however, the water that has cooled during this period must ultimately be returned to the normal elevated operating temperature and therefore this portion of energy that must be restored is not saved.

Therefore, in order to create significant energy savings, the tank water temperature should be reduced to a value close to the ambient temperature for a time long enough to render the energy required to return the water to the "set" temperature relatively small when compared to the savings resulting from eliminating differences between the tank water temperature and the ambient. Paradoxically, a poorly insulated tank without the benefit of "heat traps", for example, will cool more quickly and will therefore produce a greater savings in response to being turned off over a fixed period of time than a well insulated tank. Likewise, since a smaller volume of water will cool more quickly to the temperature of the environment, a smaller tank capacity will also produce a larger percentage savings. Also, a method which allows the stored hot water in the tank to be utilized (thus quickly lowering the tank temperature), remain unheated for a prolonged period and then reheated just prior to need, will produce the greatest savings over time.

The following patents disclose prior efforts to reduce the energy consumption of electric hot water heaters.

Bartok, et. al. (U.S. Pat. No. 4,535,931) discloses a pair of thermistors (or other mechanical means) as sensors located in intimate contact with the inlet and outlet pipes of a water heater, operating through an operational amplifier to sense the difference in temperature of these points to determine a two valued set point for the heater thermostat; "high" or "low". The intent is to reduce the tank temperature during periods of no hot water use. Bartok suggests insulating the thermistors from the ambient so that the pipe temperature is less affected by the surrounding space.

This method, although possibly providing some energy savings, suffers from an important drawback in that this control has no a priori knowledge of the present or future need for hot water. Therefore the tank temperature will cool considerably before the first use of hot water after a long period of non use; thus providing "colder" rather than "hotter" water to the first user. It is noteworthy that if the first user experiences a sufficient volume of available hot water after a long period of non use then the control has not saved an appreciable amount of energy. This will most often be the case since the heater is not turned off but rather only set back to a lower temperature.

A further disadvantage of the Bartok method is the inability of the control to predict non use of hot water and thus to allow the using up of hot water from the tank during periods just prior to a prolonged period of non use without triggering the "raise the thermostat set point condition". This would insure the water temperature is hottest after the last user and this would limit the ability of Bartok's control to lower the tank temperature quickly so as to gamer the most energy savings during the non use period, i.e. the most energy savings accrue when the tank temperature is close to the ambient temperature.

Further, since the specific heat of water is high, the signal to raise the thermostat to the high operating set point may reset (due to simultaneous cooling of the relatively small volume of water in the exit pipe and the heating-caused by conduction and back flow of the small volume of water in the inlet pipe) before the large volume of water in the tank reaches the high operating temperature and thus the tank temperature may remain perpetually warm rather than hot.

As most modem water heaters are fitted with heat traps to prevent heat losses from conduction and convection of heated water from both the exit and inlet pipes, a small volume of water use will raise the thermostat set point for a long period; this resulting from the inability of the inlet and exit pipes to approach each other's temperatures, especially when well insulated from the environment (as Bartok suggests) and may render the control inoperative.

Another disadvantage of this scheme occurs when the ambient in the space (surrounding the water heater) is heated during the day, and left unheated at night. Under these conditions the water temperature in the inlet pipe could vary by 35° F. making the setting of the threshold for raising and lowering the thermostat "set" point and its associated hysteresis impractical to determine. Also, the heater inlet pipe may be subject to a long pipe run within a heated space, such as might occur in an office complex or industrial setting, thus rendering the inlet temperature constant and since the functioning of the control makes use of the dropping inlet water temperature relative to the exit water temperature, making it difficult to find the correct threshold temperature difference to switch to the high temperature setting; as a result the control may not function as intended.

Kenneth W. Scott discloses an invention in U.S. Pat. No. 4,413,775 that is similar to the Bartok et al. patent and on which Bartok has improved. Scott employs two temperature sensing switches rather than thermistors, each on the inlet and exit pipes of the hot water heater and uses the set points of these switches to detect the 135° F. fixed high temperature set point on the exit pipe and a fixed 100° F. on the inlet pipe. Scott states "During periods of low use, heat energy is wasted if the temperature of the water remains at a high level. For example, a temperature of 120° F. is adequate for all ordinary purposes, and a higher temperature does not ordinarily result in a higher temperature of the water actually used, but merely means that the user will mix more cold water with the hot for showering." Scott fails to mention that a portion of the energy not supplied to the system while the water cools exponentially from the high 135° F. setting to the lower 120° F. setting is not actually saved but must be returned to the system when again raising the water temperature to the high setting; while the energy saved is related linearly to the average tank temperature difference between the high and low setting. In order to effect significant savings, the tank temperature must be allowed to drop significantly from the high temperature set point and remain at that level for a long period of time.

Scott has also made some improvements to U.S. Pat. No. 4,166,944 which climatizes the inlet water temperature sensor threshold to 5° F. to 10° F. above the seasonal inlet water temperature. However, a heat trap on the inlet pipe (commonly installed on modem water heaters) will prevent the inlet pipe to refill with heated water from the tank and the control will not operate as implied.

SUMMARY OF THE INVENTION

Hot water heating for domestic use requires temperature settings between 120° F. and 160° F. depending upon the capacity of the tank, the required maximum volume and flow needed and intended use. For example, washing dishes or clothes by machine generally requires higher temperatures and if the capacity of the tank is small compared to the necessary flow rate, temperature settings of 160° F. to 180° F. may be necessary so as to allow mixing with sufficient cold water to extend the tank capacity. The heater temperature is maintained by a control embodying a thermostat which, due to hysteresis, maintains the water temperature between ±5° F. and ±10° F. of the "set" point.

Significant energy savings may accrue if the heating of the water is limited to periods immediately before and during the intended need and if the intervals between use are relatively long and if the capacity of the tank is relatively small. In an office or other business environment the use of hot water is most likely supplied by a small tank (6 to 10 gallons)for hand washing purposes and normally for five or six days a week during business hours (excepting holidays). This use pattern provides an excellent opportunity for significant savings. Likewise, vacation homes used only during week-end periods present a similar opportunity.

This invention utilizes a thermistor device located on the exit pipe of the subject hot water heater and a microprocessor. The microprocessor is used to measure the rate of temperature rise or fall in the pipe as a means to detect intervals during which hot water is used, to analyze the resulting usage profile, and through the application of an appropriate use prediction and "holiday" detection algorithm, turn the heater off during such non-use periods. This invention does not attempt to set the in-use water temperature, this being left to the user based upon the parameters previously discussed; but it does monitor and use points at which the thermostat closes and opens(the heating turn-on and turn-off temperatures) in response to the user's setting of the thermostat. A second thermistor device is utilized on the tank body to insure the tank temperature does not fall below the required 15° F. above the exit pipe temperature; in this case the tank is heated.

A microprocessor program/control includes an algorithm software as set forth in the State Diagram of FIG. 2 under the influence of which the heater has three operational states: OPERATE, TRANSITION and SLEEP. During all states the intervals during which hot water flows is monitored and recorded and a profile of each of the last twenty-one (21) days is retained. During the OPERATE state the heater operates normally, heating periodically under the influence of the thermostat set point temperature and during which time a prediction is made through calculation as to the most appropriate time to TRANSITION to, or to directly set the control to the SLEEP state. Embedded within the OPERATE state is the capability for the detection of a "holiday" event whereby the TRANSITION state is induced from the OPERATE state when four hours of non-use of hot water occurs during a period usage was predicted. The microprocessor control allows the heater to operate normally in the OPERATE state and by appropriate use prediction algorithms, switch the heater to the low energy use TRANSITION or SLEEP state. During the SLEEP or TRANSITION states the heater use prediction algorithms, in anticipation of hot water need, switch the heater to the thermostat controlled OPERATE state. Energy use is thus confined to periods of hot water need.

The TRANSITION state maintains the control in the heater off condition until the prediction algorithm predicts the period ahead to be a no flow period of at least eight (8) hours whereupon the control sets the heater to the SLEEP state; unless the system records flow during the TRANSITION state in which case the control is returned to OPERATE. If no flow is recorded during the TRANSITION state, the tank water temperature is allowed to cool as in SLEEP.

During the SLEEP state, heating of the tank is turned off and the tank is allowed to cool significantly from its normal operating temperature to within 15° F. above the exit pipe temperature. The heater will maintain this temperature differential using only a fraction of the energy normally required to maintain the set point temperature. Should any unpredicted flow be recorded during the SLEEP state, the heater is immediately returned to the OPERATE state, or if by prediction the need for hot water in the succeeding time period is determined, the heater is returned to the OPERATE state in anticipation of such need; also the "flow expected" prediction is altered during the SLEEP state to accommodate subsequent daily periods of hot water use due to use pattern changes.

Thus normal heating of the tank to the set point temperature takes place only during periods when flow is most prevalent by current need or by prediction; within preset limits below the set point temperature, water is allowed to be drawn from the tank to cool it in preparation for a long period of non-use, and finally, the tank temperature is reduced significantly during long periods of non-use.

With the above and other objects in view that will hereinafter appear, the nature of the invention will be more clearly understood by reference to the following detailed description, the appended claims and the several views illustrated in the accompanying drawings.

Figure 1:
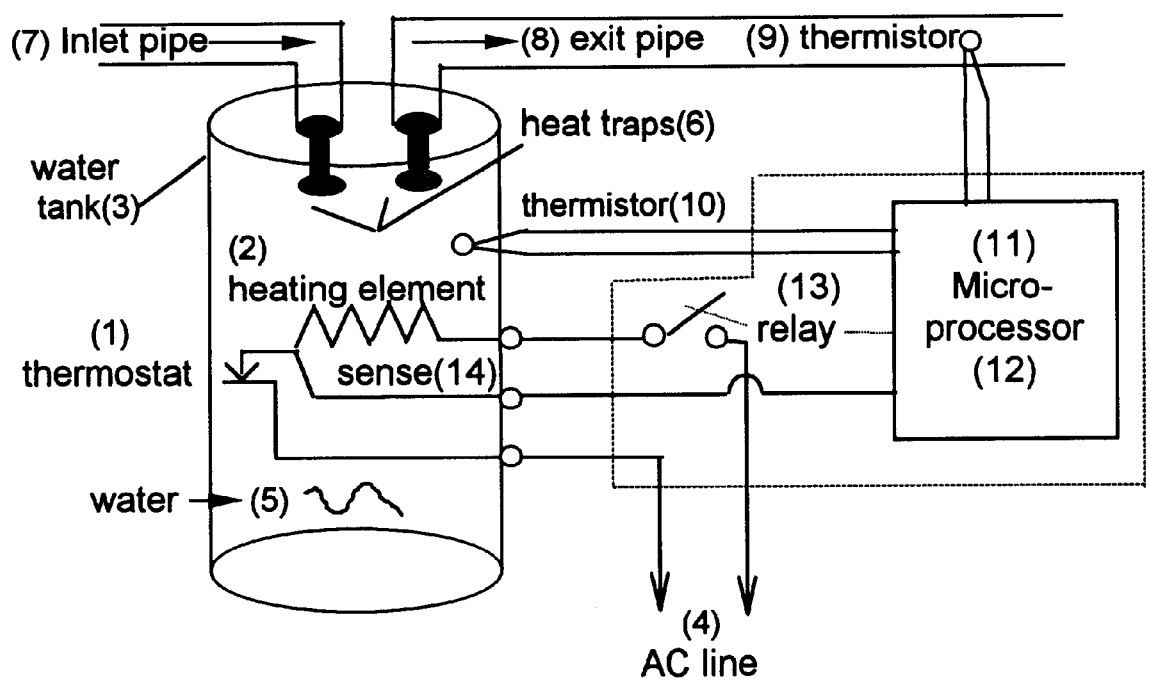
FIG. 1 illustrates the preferred embodiment of the invention attached to a cylindrical electric hot water heater.
Figure 2:
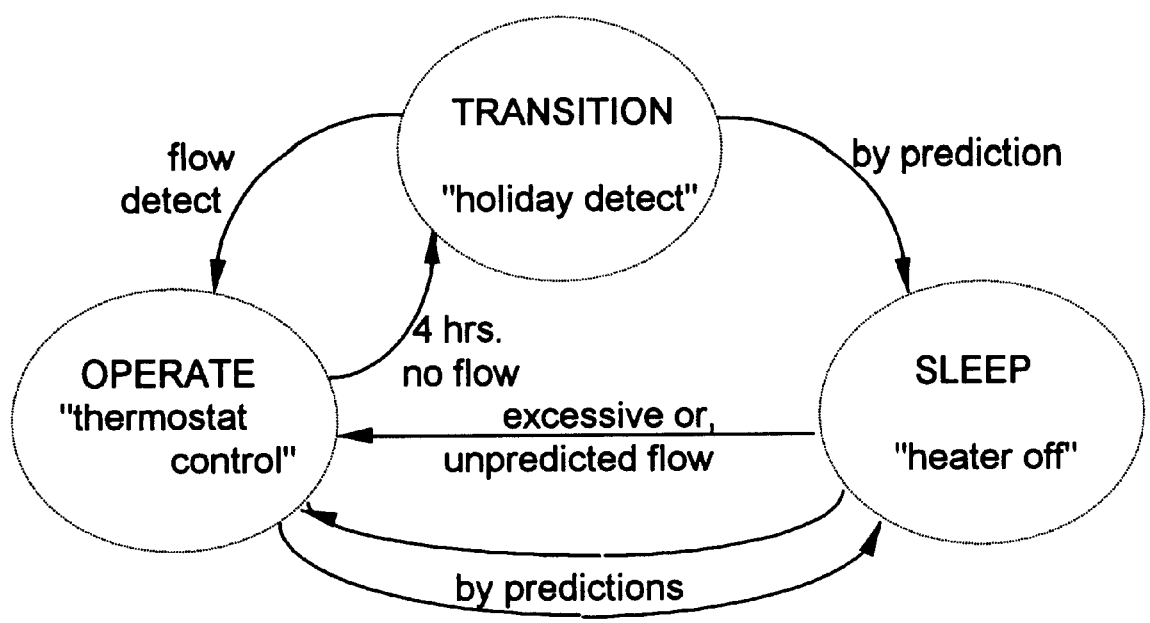
FIG. 2 depicts the invention functionally in the form of a State Diagram.

DESCRIPTION OF THE PREFERRED EMBODIMENTS.

An electric hot water heater is typically provided with a prior art thermostatic control (1) and a prior art heating element (2) which heats water in a contained vessel (3), such as a cylindrical tank. An electric current (4) is allowed to flow through the heating element (2) by the thermostatic control (1) which is usually operated by a bi-metallic contact which closes when the temperature of the surrounding water (5) is below the thermostat's "set" temperature and which opens when the temperature of the surrounding water is above the thermostat's "set" temperature. Generally, such controls are subject to hysteresis which allows the water temperature to deviate from the set value by ±5° F. or ±10° F. Thermostat "set" temperatures are typically between 120° F. and 180° F. The modem water heater is often fitted with prior art "heat-trap" devices (6), such as an anti-flow valve fitted to an insulating plastic pipe, which provide a thermal barrier to minimize heat losses to the adjoining inlet pipe (7) and exit pipe (8).

The present invention employs a prior art thermistor (9) on the exit pipe, and a prior art thermistor (10) on the tank body as a means for making measurements which through the use of a conventional microprocessor (11) and a control algorithm program (and memory) (12) to determine there is flow of hot water in the exit pipe, and to interrupt the flow of electric current (4) by use of a prior art relay (13) or other switching device under the control of the algorithm (12). A sense wire (14) is placed at the standard electrical junction between the heater element and thermostat and is connected to the microprocessor (11) to monitor the opening/closing of the thermostat.

During normal operation (FIG. 1) the microprocessor (11) monitors and collects information as to the resistive value (temperature) of the thermistors (9) and (10); the condition of the thermostat (open/closed) through sense wire (14); performs calculations based on this information and provides on/off switching control to the relay (13) or other switching device and thus allows or inhibits normal thermostat operation according to the algorithms/algorithm controls of FIGS. 2 through 8. The microprocessor (11) shown in FIG. 1 is equipped with an associated program and memory (12) which is operative such that for each interval (in this instance approximately 40 minutes) of heater use there is an associated memory cell (one bit), used to store a history of hot water use (flow), and a total storage period of three weeks. Each 24 hour day corresponds to 36 forty (40) minute intervals and for three (3) weeks corresponds to 756 cells. Thus for a three (3) week period a record of the use of hot water for each 40 minute interval of each day is available for reference by the program of the microprocessor (11).

MAINLOOP FLOWCHART (FIG. 8)

Figure 8:
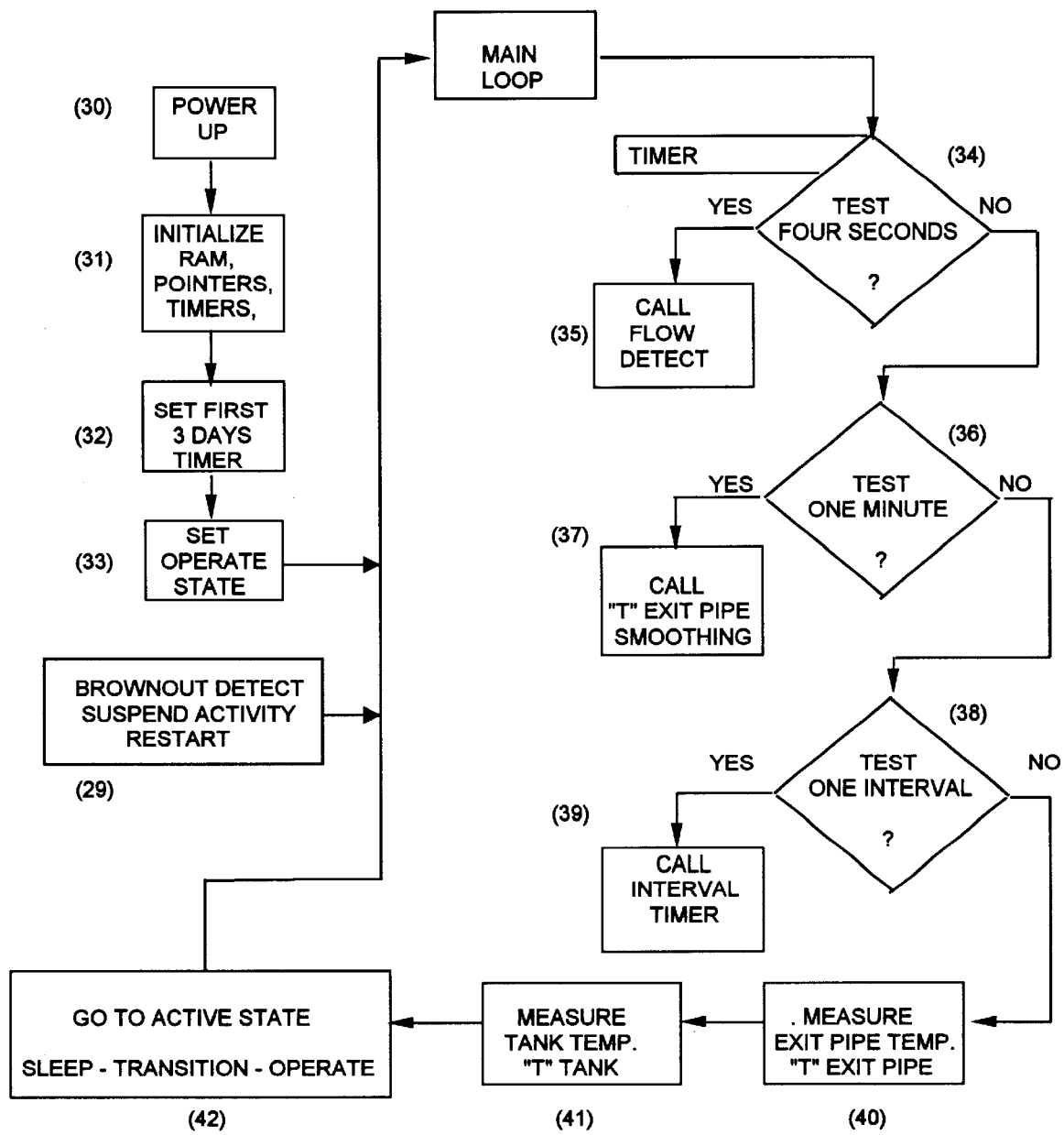
FIG. 8 illustrates the MAIN LOOP algorithm in a flow chart.

The Mainloop Flowchart of FIG. 8 represents the startup, "brownout", and timing program loop for the control by the microprocessor (11) through its program (12). During periods when the power is interrupted for short periods (10 minutes), all activity is suspended and the microprocessor (11) through its program (12) saves its database and awaits the restoration of power (29). Timing loops (34), (36), and (38) are established to periodically test for: flow detection every four seconds (35); performing "smoothing " or averaging of the exit pipe temperature every minute (37), and record the hot water flow usage data once every storage memory interval (39), otherwise the microprocessor (11), through its program (12), is continuously measuring the exit pipe temperature (40), and the tank temperature (41) and directing its control program (12) to operate under either the OPERATE (FIG. 3), TRANSITION (FIG. 4), or SLEEP (FIG. 5) control algorithm (42).

As shown in the Mainloop Flowchart (FIG. 8), when the circuit is first powered up (30) or after a prolonged power outage, the program/memory (12) of the microprocessor (11) is initialized to a beginning state (31), a flag is set indicating the device is to operate completely under normal thermostat control for the first three days of operation (32) to establish an initial data base of hot water use, and the OPERATE state (33) is set. (Also see FIG. 3.) The microprocessor control (12) allows the heater to operate at the thermostat set-point set by the user for a period of three days without interference by the microprocessor control (12). During this period, as well as during subsequent periods, a test for the use of hot water (35) is performed periodically (34); every four (4) seconds. (Also see FIG. 6. Flow Detect.) Here, the water use history is recorded and stored in the microprocessor memory (12) in a memory location corresponding to the use interval. At the conclusion of the three day period the recorded history for each interval during the three recorded days is used to set the corresponding interval in each of the next four days through a mathematical "logical or" of the corresponding interval in each day. (See FIG. 3—OPERATE State Flow Chart (70).) Thus if any hot water use occurred in any given interval during the first three (3) days, that use pattern is used during the last four (4) days of the first seven (7) days (71) operation as a statistical compromise to allow prediction of use during that four (4) day period. After the initial seven (7) days, operation of the heater control for the following seven (7) days is based on collected data for the previous seven (7); and for the last seven (7) day period comprising a twenty-one (21) day period, operation is based on the previous fourteen (14) day period. Thereafter, predictions for future heater operation is based on a most recent twenty-one (21) day history of operation by performing a mathematical "logical or" of hot water use for the corresponding intervals of three (3) weeks of hot water use data (72).

Thus the "energy savings/convenience" performance of the algorithmic microprocessor control (12) consistently improves from "zero savings/maximum hot water availability convenience" during the first three (3) days to a maximum savings/appropriate hot water availability convenience" over a three (3) week period when compared to a standard heater control.

Figure 3:
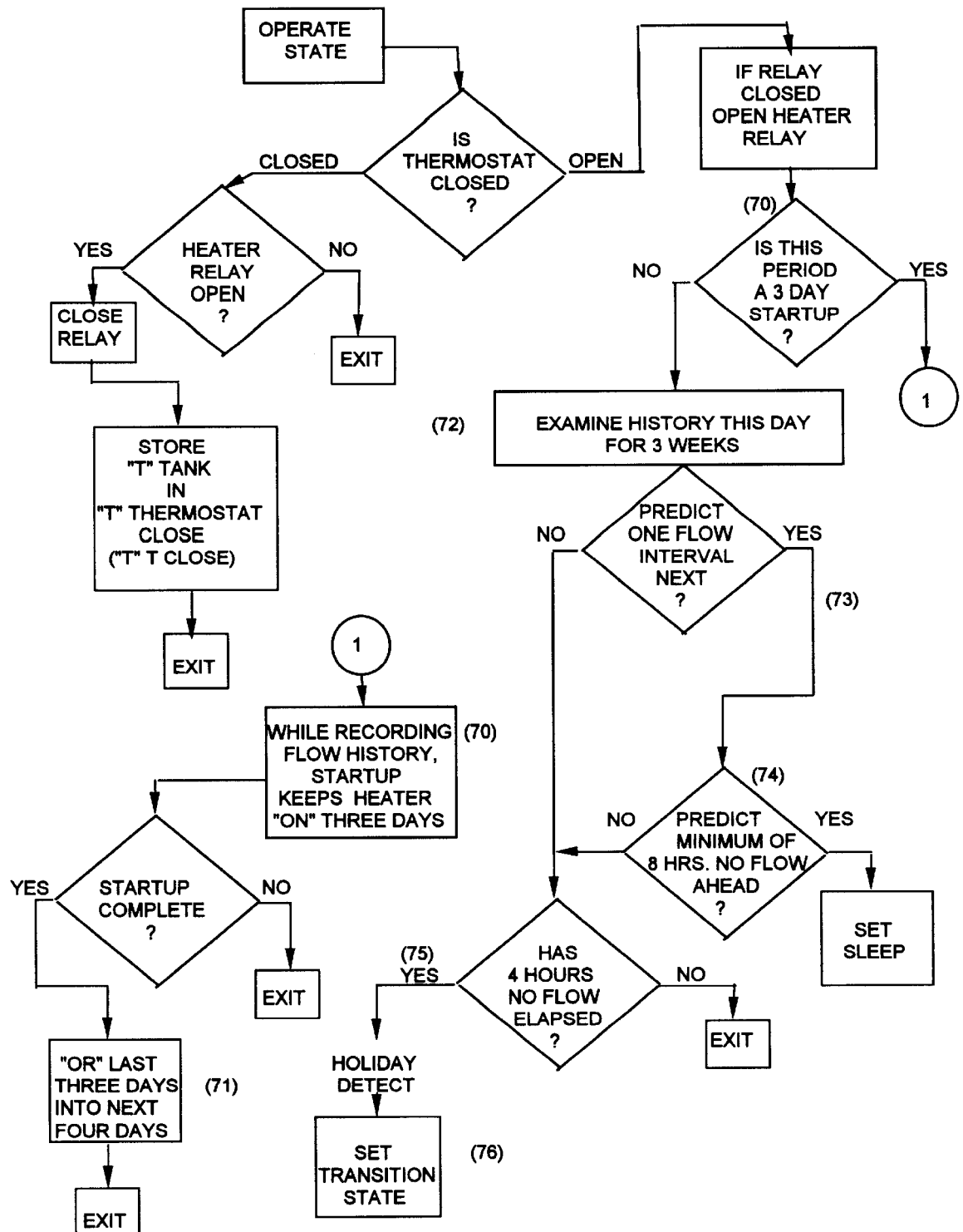
FIG. 3 illustrates the OPERATE state algorithm in a flow chart.
Figure 4:
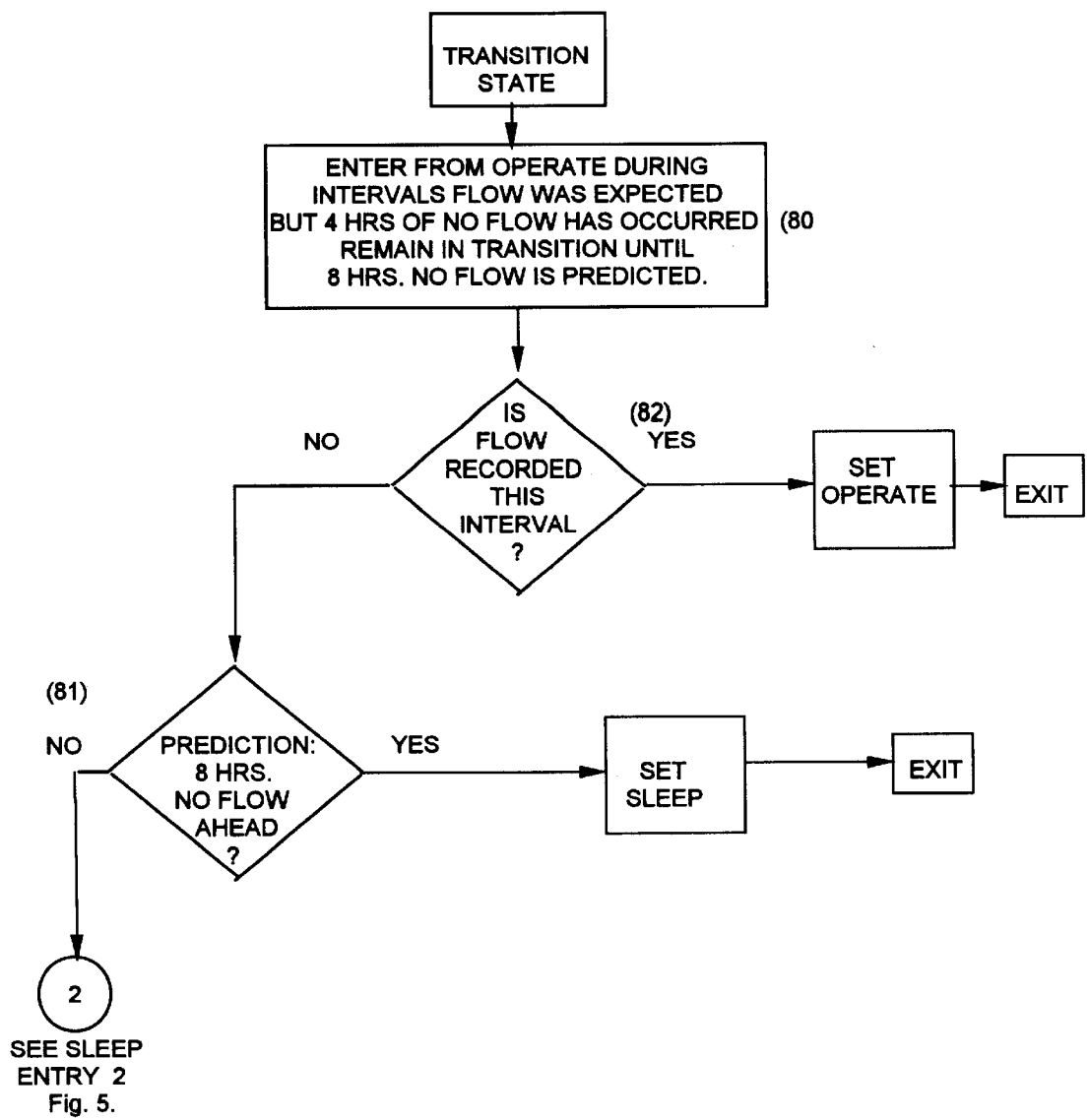
FIG. 4 illustrates the TRANSITION state algorithm in a flow chart.
Figure 7:
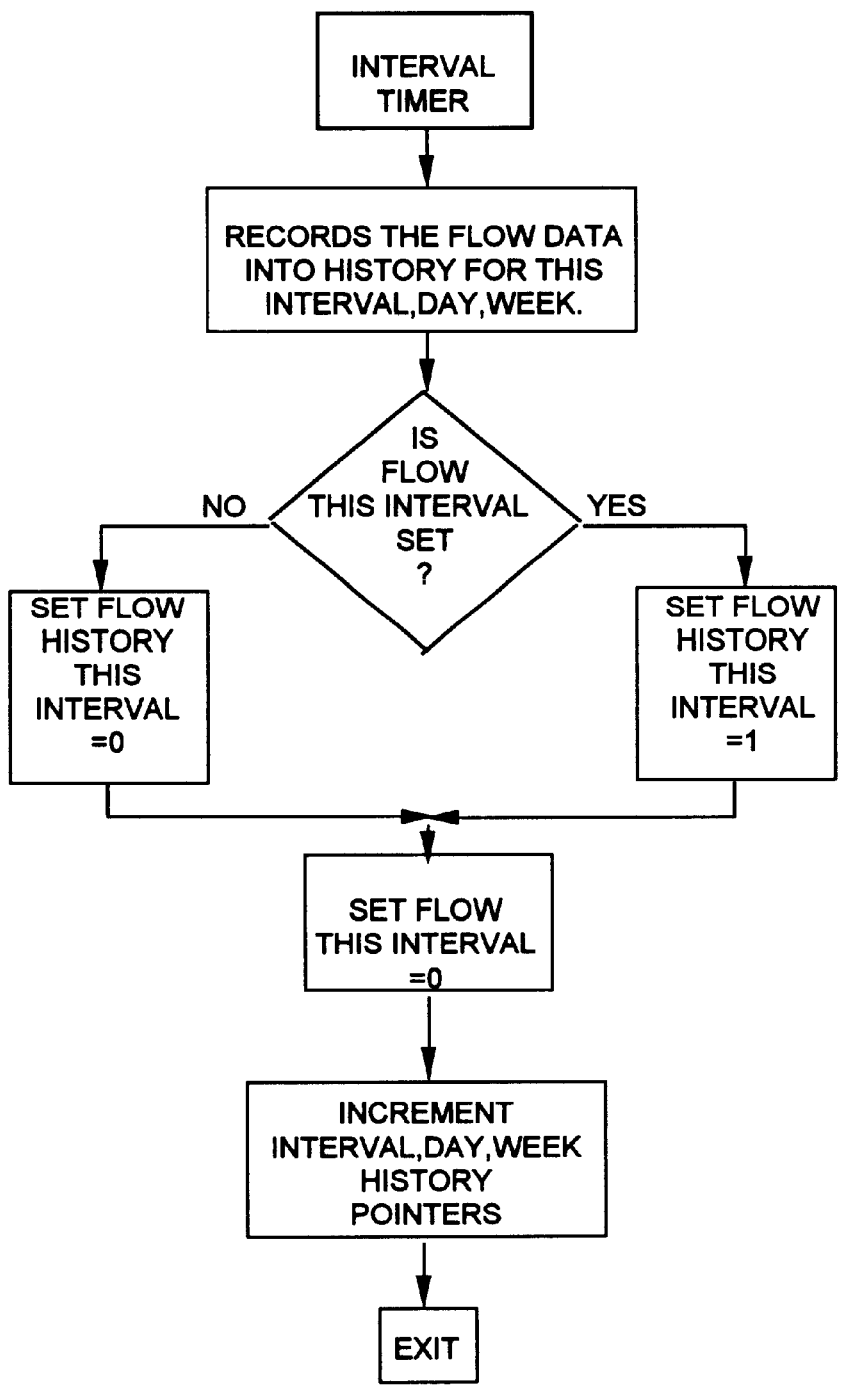
FIG. 7 illustrates the INTERVAL TIMER algorithm in a flow chart.

During periods following the three (3) day startup, the precise algorithmic control provided by the microprocessor software/control (12) begins to create savings, based on up to three (3) weeks of history, by predicting use of hot water in the ensuing interval (73), followed by a prediction for a minimum of eight (8) hours of no hot water use (74). This prediction causes the microprocessor control (12) to enter the SLEEP state. In the absence of this prediction the microprocessor control (12) either waits for the occurrence of a period of four (4) hours of no hot water use (75) and sets the TRANSITION state in anticipation of a holiday, or, remains in the OPERATE state. The flow charts of FIG. 8. MAINLOOP; FIG. 7—INTERVAL TIMER; FIG. 3—OPERATE; FIG. 4—TRANSITION; and FIG. 5—SLEEP functionally illustrate this process.

TRANSITION FLOWCHART (FIG. 4)

Figure 5:
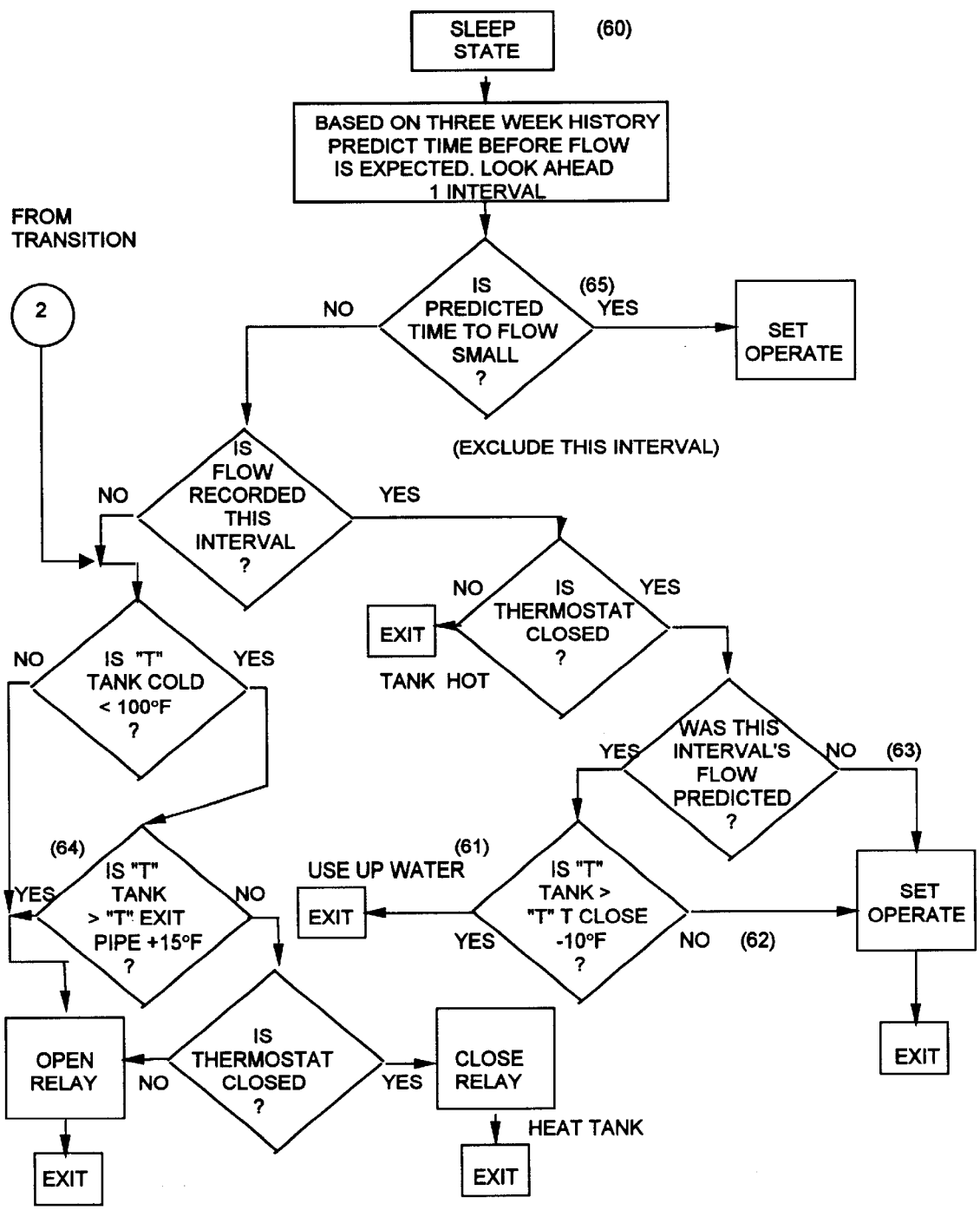
FIG. 5 illustrates the SLEEP state algorithm in a flow chart.

The TRANSITION state (80) is entered from the OPERATE state and maintains the microprocessor or control (12) in the heater off condition until the prediction algorithm software predicts the period ahead to be a no flow period of at least eight (8) hours (81), whereupon the microprocessor control (12) sets the heater to the SLEEP state; unless the system records flow during the TRANSITION state (82), in which case the microprocessor control (12) is returned to OPERATE. If no flow is recorded during the TRANSITION state, the tank water temperature is allowed to cool as in SLEEP (FIG. 5).

Figure 6:
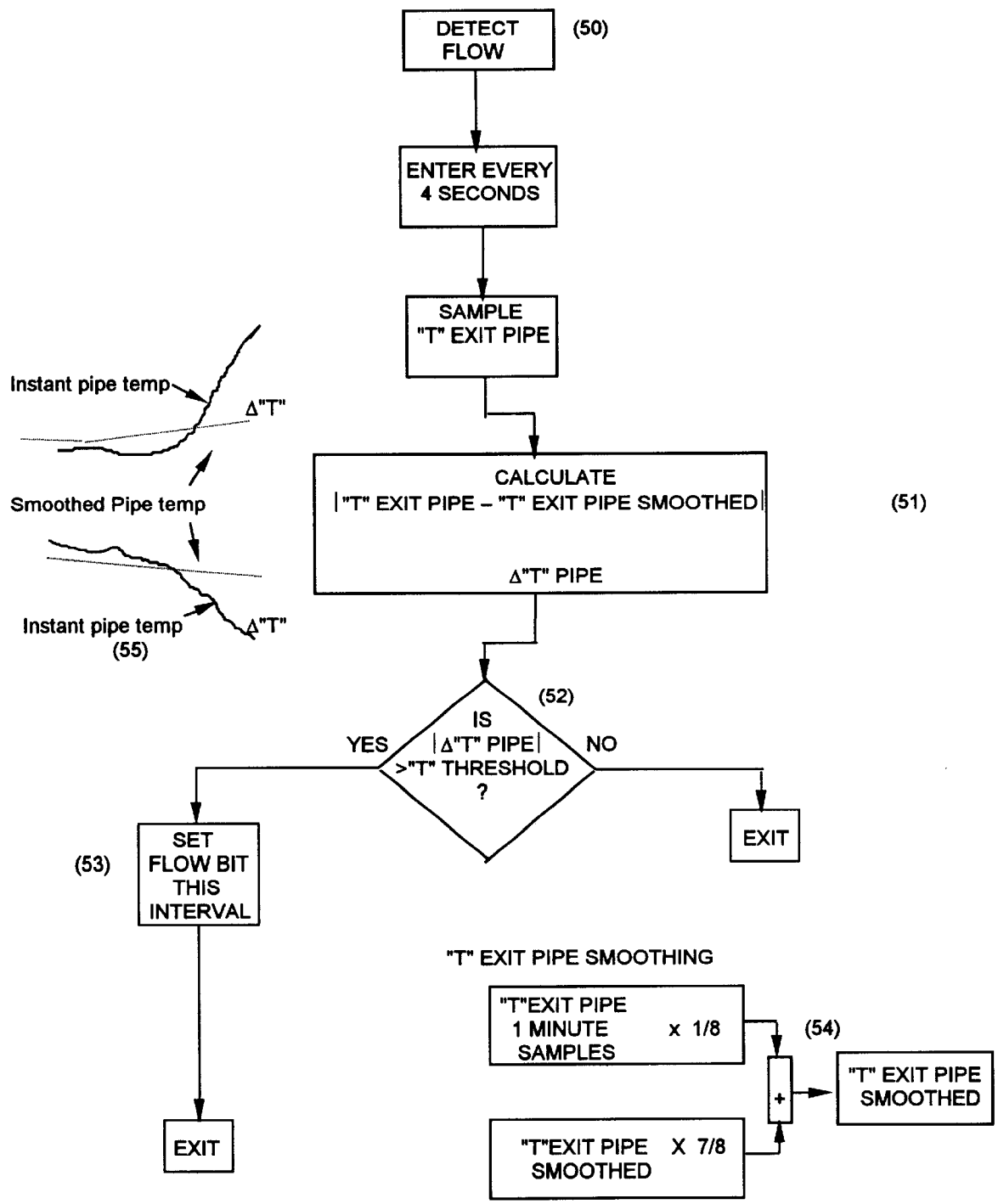
FIG. 6 illustrates the FLOW DETECT algorithm in a flow chart and outlines a method of determining if hot water use has occurred.

Flow Detection and Exit Pipe Temperature Smoothing (FIG. 6)

A characteristic of water flowing intermittently in pipe sizes typical of domestic hot water use suspended in air is that the pipe will assume the water temperature within a few seconds of the onset of flow; and because of the relatively high specific heat of water, the pipe will change temperature slowly in response to the surrounding ambient, when flow ceases.

FIG. 6 illustrates the detection process to signal the flow of hot water at least once during an interval. The DETECT FLOW algorithm (50) is entered periodically (in this instance every four (4) seconds) from the program MAIN LOOP timer. At this time, exit pipe thermistor (9) and the microprocessor control (12) is used to measure and calculate (51) the difference between the current exit pipe temperature ("T" EXIT PIPE) and the exit pipe temperature averaged over a relatively long period ("T" EXIT PIPE SMOOTHED); and the magnitude of the difference ("ΔT" PIPE) (52) is compared to a threshold value, which signals the use of hot water (53) if the threshold is exceeded. The mathematical "smoothing" of the exit pipe temperature (54) is performed by giving a smaller (in this case 7) weighting to pipe temperature samples taken every minute and a larger (in this case Q) weighting to the previously smoothed value. Since the flow detection process is not based on the actual pipe temperature but rather on the rate of change of the pipe temperature, this method provides a high probability of detecting flow at least once during each interval (in this instance every 40 minutes).

This flow detection method also applies during periods when the flow rate exceeds the capacity of the heater to supply hot water, in this case, the exit pipe temperature drops rapidly below the "smoothed" value and causes the magnitude of the difference ("ΔT" PIPE) to exceed the threshold value (55) and also indicate water flow during the interval.

Flow Detection During Sleep, Extended Sleep, And Transition (FIG. 5)

FIG. 5 illustrates the SLEEP state flow chart Entering the SLEEP state (60) during a flow interval preceding a long no flow period allows the system to hold-off the heating of water even when the microprocessor control (12) reaches the closing temperature of the thermostat (61) if it was predicted from a three week flow history for that interval. This is done to allow the system to use up some of the stored hot water and more quickly lower the tank temperature during sleep. This feature saves energy by "using" the stored hot water rather than wasting it by allowing it to cool to the environment and by maximizing the tank temperature differential to the ambient. If the tank temperature drops too far (62) or if the flow in the interval was not predicted (63), then recovery to the OPERATE state is immediately initiated for an additional heating cycle.

After the initial predicted flow has completed, the system is allowed to enter an extended sleep (64) wherein the tank temperature is allowed to cool to within 15° F. of the exit pipe temperature. During this period the tank is only heated when it becomes necessary to provide a sufficient differential to the exit pipe temperature to detect flow.

The system remains in the SLEEP state until either the predicted time to flow (based on a three week history) is small (i.e. hot water use is imminent) (65) or until unpredicted flow is detected (63). The state is then immediately switched to OPERATE (FIG. 3). In the event unpredicted flow is detected during SLEEP, then a tag is attached to the corresponding history interval in the following day, thus forewarning the system of the possibility of flow for that interval in the following day. This allows the control to be responsive to changes that may occur from daylight savings to standard time or to work schedule changes.

During the OPERATE state (FIG. 3) there may be periods when flow is expected but does not occur for an extended period of time (75) (in this case 4 hours). In this instance the system then transfers control to the TRANSITION state (76) in anticipation this may be due to a holiday event. During TRANSITION state the system behaves as in SLEEP except that the tank is not allowed to cool by the "using-up" of hot water. In the event flow is detected the system is immediately returned to the OPERATE state; otherwise by prediction of no use in the ensuing 8 hours, the system transfers to the SLEEP state via exit point 2 of TRANSITION flow chart (FIG. 4) and via entry point 2 of SLEEP flow chart (FIG. 5).

Although a preferred embodiment of the invention has been specifically illustrated and described herein, it is to be understood that minor variations may be made in the apparatus without departing from the spirit and scope of the invention, as defined in the appended claims.

What is claimed is:

1. A control system for controlling a hot water heater to effect energy savings comprising first sensing means for sensing over an extended period of time the exit pipe flow of a hot water heater, second sensing means for sensing over an extended period of time the tank temperature of a hot water heater, a processor including
   (a) first circuit means for establishing a hot water usage profile of the exit pipe flow defined by periods of water use and periods of water non-use,
   (b) second circuit means utilizing the hot water usage profile for predicting at least one of future hot water non-usage and hot water usage through future use/non-use algorithm circuitry, and
   (c) third circuit means for utilizing the predicted future hot water usage to control a heater of the hot water heater to effect energy savings.

2. The control system as defined in claim 1 wherein said third circuit means de-energizes the heater during such hot water non-usage.

3. The control system as defined in claim 2 wherein said microprocessor further includes
   (d) fourth circuit means for operating the heater to assure the tank temperature is maintained at least several degrees above the exit pipe temperature.

4. The control system as defined in claim 2 wherein said microprocessor further includes
   (d) "holiday" detection algorithm circuitry for de-energizing the heater during holiday non-use of water.

5. The control system as defined in claim 2 wherein the hot water usage profile is for substantially twenty-one consecutive days.

6. The control system as defined in claim 2 wherein said microprocessor further includes
   (d) "holiday" detector algorithm circuitry for de-energizing the heater upon a predetermined short period of water non-use occurring during a period of predicted water use.

7. The control system as defined in claim 2 wherein said microprocessor further includes
   (d) "holiday" detector algorithm circuitry for de-energizing the heater upon a predetermined four hour period of water non-use occurring during a period of predicted water use.

8. The control system as defined in claim 2 wherein the hot water usage profile is for substantially the most recent three consecutive complete weeks.

9. The control system as defined in claim 2 wherein said microprocessor includes
   (d) fourth circuit means for calculating the difference between periodically sensed exit pipe temperature and an average of pipe temperature sensed over the extended period of time to arrive at a temperature difference indicative of water usage, and
   (e) fifth circuit means for energizing the heater upon the temperature difference exceeding a threshold value indicative of water usage.

10. The control system as defined in claim 2 wherein said microprocessor includes
    (d) fourth circuit means for calculating the difference between periodically sensed exit pipe temperature and an average of pipe temperature sensed over the extended period of time to arrive at a temperature difference indicative of water usage,
    (e) fifth circuit means for energizing the heater upon the temperature difference exceeding a threshold value indicative of water usage, and
    said fourth circuit means is operative at the end of relatively short consecutive time periods thereby providing a high probability of detecting flow during each such consecutive time period.

11. The control system as defined in claim 2 wherein said microprocessor includes
    (d) fourth circuit means for calculating the difference between periodically sensed exit pipe temperature and an average of pipe temperature sensed over the extended period of time to arrive at a temperature difference indicative of water usage,
    (e) fifth circuit means for energizing on the heater upon the temperature difference exceeding a threshold value indicative of water usage, and
    said fourth circuit means is operative at the end of each consecutive forty minute time period thereby providing a high probability of detecting flow during each such consecutive time period.

12. The control system as defined in claim 2 wherein said microprocessor includes
    (d) fourth circuit means for preventing the heater from being energized during hot water usage shortly prior to predicted water non-usage whereby tank water can be used absent heating to lower tank water temperature through hot water usage.

13. The control system as defined in claim 2 wherein said microprocessor includes
    (d) fourth circuit means for preventing the heater from being energized during hot water usage shortly prior to predicted water non-usage whereby tank water can be used absent heating to lower tank water temperature through hot water usage,
    (e) fifth circuit means for calculating the difference between periodically sensed exit pipe temperature and an average of pipe temperature sensed over the extended period of time to arrive at a temperature difference indicative of water usage, and
    (f) sixth circuit means for energizing the heater only to provide an exit pipe temperature sufficient to establish a temperature difference indicative of water usage.

14. The control system as defined in claim 2 wherein said microprocessor includes
    (d) fourth circuit means for preventing the heater from being energized during hot water usage shortly prior to predicted water non-usage whereby tank water can be used absent heating to lower tank water temperature through hot water usage,
    (e) fifth circuit means for calculating the difference between periodically sensed exit pipe temperature and an average of pipe temperature sensed over the extended period of time to arrive at a temperature difference indicative of water usage, and
    (f) sixth circuit means for turning on the heater only to provide an exit pipe temperature sufficient to assure the tank temperature is maintained at a temperature above the exit pipe temperature and establish a temperature difference indicative of water usage.

15. The control system as defined in claim 1 wherein said first sensing means senses exit pipe temperature of the hot water heater from which is derived exit pipe flow, and said processor further includes
    (d) fourth circuit means for operating the heater to assure the tank temperature is maintained at a temperature above the exit pipe temperature.

16. The control system as defined in claim 15 wherein said microprocessor further includes
    (e) "holiday" detection algorithm circuitry for de-energizing the heater during holiday non-use of water.

17. The control system as defined in claim 15 wherein said microprocessor further includes
    (e) "holiday" detector algorithm circuitry for de-energizing the heater upon a predetermined short period of water non-use occurring during a period of predicted water use.

18. The control system as defined in claim 15 wherein said microprocessor includes
    (e) fifth circuit means for calculating the difference between periodically sensed exit pipe temperature and an average of pipe temperature sensed over the extended period of time to arrive at a temperature difference indicative of water usage, and (f) sixth circuit means for energizing the heater upon the temperature difference exceeding a threshold value indicative of water usage.

19. The control system as defined in claim 15 wherein said microprocessor includes (e) fifth circuit means for calculating the difference between periodically sensed exit pipe temperature and an average of pipe temperature sensed over the extended period of time to arrive at a temperature difference indicative of water usage, (f) sixth circuit means for energizing the heater upon the temperature difference exceeding a threshold value indicative of water usage, and said fourth circuit means is operative at the end of relatively short consecutive time periods thereby providing a high probability of detecting flow during each such consecutive time period.

20. The control system as defined in claim 15 wherein said microprocessor includes (e) fifth circuit means for preventing the heater from being energized during hot water usage shortly prior to predicted water non-usage whereby tank water can be used absent heating to lower tank water temperature through hot water usage.

21. The control system as defined in claim 1 wherein said microprocessor further includes (d) "holiday" detection algorithm circuitry for de-energizing the heater during holiday non-use of water.

22. The control system as defined in claim 1 wherein the hot water usage profile is for substantially twenty-one consecutive days.

23. The control system as defined in claim 1 wherein said microprocessor further includes (d) "holiday" detector algorithm circuitry for de-energizing the heater upon a predetermined short period of water non-use occurring during a period of predicted water use.

24. The control system as defined in claim 1 wherein said microprocessor further includes (d) "holiday" detector algorithm circuitry for de-energizing the heater upon a predetermined four hour period of water non-use occurring during a period of predicted water use.

25. The control system as defined in claim 1 wherein the hot water usage profile is for substantially the most recent three consecutive complete weeks.

26. The control system as defined in claim 1 wherein said microprocessor includes (d) fourth circuit means for calculating the difference between periodically sensed exit pipe temperature and an average of pipe temperature sensed over the extended period of time to arrive at a temperature difference indicative of water usage, and (e) fifth circuit means for energizing the heater upon the temperature difference exceeding a threshold value indicative of water usage.

27. The control system as defined in claim 1 wherein said microprocessor includes (d) fourth circuit means for calculating the difference between periodically sensed exit pipe temperature and an average of pipe temperature sensed over the extended period of time to arrive at a temperature difference indicative of water usage, (e) fifth circuit means for energizing the heater upon the temperature difference exceeding a threshold value indicative of water usage, and said fourth circuit means is operative at the end of relatively short consecutive time periods thereby providing a high probability of detecting flow during each such consecutive time period.

28. The control system as defined in claim 1 wherein said microprocessor includes (d) fourth circuit means for calculating the difference between periodically sensed exit pipe temperature and an average of pipe temperature sensed over the extended period of time to arrive at a temperature difference indicative of water usage, (e) fifth circuit means for energizing the heater upon the temperature difference exceeding a threshold value indicative of water usage, and said fourth circuit means is operative at the end of each consecutive forty minute time period thereby providing a high probability of detecting flow during each such consecutive time period.

29. The control system as defined in claim 1 wherein said microprocessor includes (d) fourth circuit means for preventing the heater from being energized during hot water usage shortly prior to predicted water non-usage whereby tank water can be used absent heating to lower tank water temperature through hot water usage.

30. The control system as defined in claim 1 wherein said microprocessor includes (d) fourth circuit means for preventing the heater from being energized during hot water usage shortly prior to predicted water non-usage whereby tank water can be used absent heating to lower tank water temperature through hot water usage, (e) fifth circuit means for calculating the difference between periodically sensed exit pipe temperature and an average of pipe temperature sensed over the extended period of time to arrive at a temperature difference indicative of water usage, and (f) sixth circuit means for energizing the heater only to provide an exit pipe temperature sufficient to establish a temperature difference indicative of water usage.

31. The control system as defined in claim 1 wherein said microprocessor includes (d) fourth circuit means for preventing the heater from being energized during hot water usage shortly prior to predicted water non-usage whereby tank water can be used absent heating to lower tank water temperature through hot water usage, (e) fifth circuit means for calculating the difference between periodically sensed exit pipe temperature and an average of pipe temperature sensed over the extended period of time to arrive at a temperature difference indicative of water usage, and (f) sixth circuit means for energizing the heater only to provide an exit pipe temperature sufficient to assure the tank temperature is maintained at a temperature above the exit pipe temperature and establish a temperature difference indicative of water usage.

* * * * *